United States Patent [19]

Hopkins

[11] Patent Number: 4,989,082
[45] Date of Patent: Jan. 29, 1991

[54] IMAGE PROCESSING SYSTEM FOR COMPARING A TEST ARTICLE WITH A MASTER ARTICLE TO DETERMINE THAT AN OBJECT IS CORRECTLY LOCATED ON THE TEST ARTICLE

[75] Inventor: Brian M. Hopkins, Mahonburg, Ireland

[73] Assignee: Westinghouse Electric Corp., Pittsburgh, Pa.

[21] Appl. No.: 385,749

[22] Filed: Jul. 26, 1989

[30] Foreign Application Priority Data

Jul. 29, 1988 [IE] Ireland ................................ 2350/88

[51] Int. Cl.⁵ ............................................. H04N 7/18
[52] U.S. Cl. ..................................... 358/101; 358/106; 382/8; 382/33
[58] Field of Search ..................... 358/106, 101, 107; 382/8, 33, 34

[56] References Cited

U.S. PATENT DOCUMENTS

| | | | |
|---|---|---|---|
| 4,607,387 | 8/1986 | Miyagawa | 382/33 |
| 4,772,125 | 9/1988 | Yoshimura et al. | 358/106 X |
| 4,799,175 | 1/1989 | Sano et al. | 358/106 X |

Primary Examiner—Victor R. Kostak

[57] ABSTRACT

An image processing system for inspecting an article under test to determine whether a selected object is correctly located on the article comprises a television-type camera for line-by-line scanning the article to generate a video signal corresponding to an image of the article, and threshold logic for converting the video signal into a first binary video signal in which the selected object is represented by a first logic level and non-selected objects and background are represented by a second logic level. A first image store stores a second binary video signal corresponding to a master image of the article in which the selected object is not represented but instead in which the region of the article within which the selected object should lie is represented. Also, a second image store stores information defining the correct area of the selected object on the article. The lines of the second binary video signal are read from the first store in synchronism with the lines of the first binary video signal, and logic circuitry responsive to the first and second binary video signals measures the degree of overlap of the selected object with the respective region within which such object should lie. Finally, the measured degree of overlap of the selected object with the correct area of such object is determined.

8 Claims, 4 Drawing Sheets

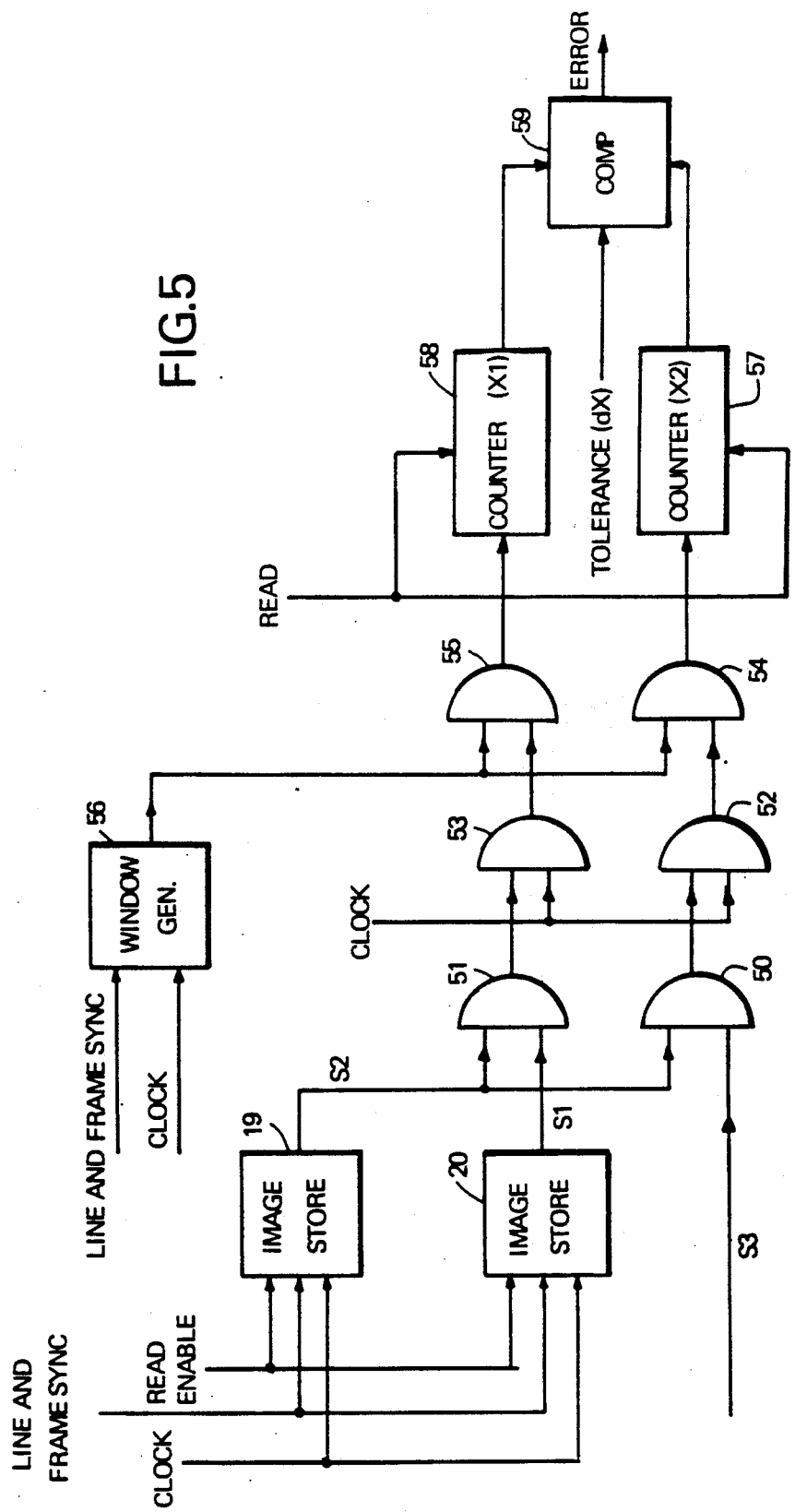

IMAGE PROCESSING SYSTEM FOR COMPARING A TEST ARTICLE WITH A MASTER ARTICLE TO DETERMINE THAT AN OBJECT IS CORRECTLY LOCATED ON THE TEST ARTICLE

RELATED APPLICATIONS

This application relates to pending U.S. patent application, Ser. No. 340,989, filed Apr. 20, 1989, entitled "Image Processing System" and assigned to the assignee of the present invention.

FIELD OF THE INVENTION

This invention relates generally to an image processing system for inspecting articles of the kind where an article under test is scanned line by line to generate a video signal corresponding to an image of the article, and desired feature(s) in the image are extracted from the video signal and compared with corresponding features of an image of a "master" article, i.e. an article which is known to be acceptable, in order to determine whether the article under test is itself acceptable.

BACKGROUND OF THE INVENTION

An example of such a system is described in the above-identified related application, the contents of which are incorporated herein by reference.

However, the aforementioned system is primarily concerned with "front end" processing, i.e. the actual raster scanning of the article under test to produce a video signal, and the processing of the video signal to provide a binary signal S in which at least one selected image feature is represented by a first logic level and non-selected features and background are represented by a second logic level. The actual comparison techniques which may be used do not form a central part of the related application.

By contrast, it is an object of the present invention to provide a particular comparison technique which can operate in real time using both a binary signal of the type such as the aforesaid signal S derived by scanning the article under test (but not necessarily derived in the specific manner described in the above identified related application), together with image information concerning the master article previously stored in at least two storage means.

SUMMARY OF THE INVENTION

According to the present invention there is provided an image processing system for inspecting an article under test to determine whether at least one selected object is correctly located on the article, the system comprising:

raster scan means for line-by-line scanning the article to generate a video signal corresponding to an image of the article, threshold logic for converting the video signal into a first binary video signal in which the at least one selected object on the article is represented by a first logic level and non-selected objects and background are represented by a second logic level, a first storage means for storing a second binary video signal corresponding to a master image of the article in which the at least one selected object is not represented but instead in which the region of the article within which the at least one selected object should lie is represented, a second storage means for storing information defining the correct area of the at least one selected object on the article, means for reading the lines of the second binary video signal from the first storage means in synchronism with the lines of the first binary video signal, measuring means responsive to the first and second binary video signals for measuring the degree of overlap of the at least one selected object, as represented in the first binary video signal, with the respective region within which such object should lie, as represented in the second binary video signal, and comparison means for comparing the measured degree of overlap of the at least one selected object as determined by the measuring means with the correct area of such object as defined by the information in the second storage means.

Clearly, the measured degree of overlap will be a measure of the mis-match of the at least one object with the region, so that the comparison means is able, by reference to a tolerance value, to determine whether the degree of overlap is sufficient for acceptability.

A particular application of the invention is in the inspection of printed circuit boards (PCB's). Such boards have conductive pads on their surface, and it is important that, for example, surface mounted devices (SMD's) are correctly located relative to such pads. In other words, the electrodes of the SMD's must overlie the respective pads, if not exactly at least to an acceptable extent.

However, it must be clearly understood that the invention is not limited to the inspection of printed circuit boards for correct alignment of SMD electrodes with pads, but has general applicability to the inspection of articles where it is desired to determine whether at least one object is correctly located on the article.

Preferably, the second storage means is adapted for storing a third binary video signal corresponding to a master image of the article in which the at least one selected object on the article is represented with correct area and location, and wherein second measuring means are provided responsive to the third binary video signal for measuring the correct area of the at least one selected object as represented in the third binary video signal.

Preferably, also, the first and/or second storage means are each selectively connectable to the threshold logic whereby each of the second and third binary video signals can be derived by scanning and thresholding a master article and storing the resulting signal in its respective store prior to scanning the article under test.

However, it is alternatively possible to download the contents of the first and second storage means from a computer, for example from CAD information held in the computer. In other words, the master image held in each storage means need not be derived from scanning an actual master article.

In its application to PCB's as referred to above, the at least one "object" would be an SMD electrode and the "region" the corresponding PCB pad. The invention further provides an image processing method for inspecting an article under test to determine whether at least one selected object is correctly located on the article, the method comprising:

line-by-line raster scanning the article to generate a video signal corresponding to an image of the article, converting the video signal by threshold logic into a first binary video signal in which the at least one selected object on the article is represented by a first logic level and non-selected objects and background are represented by a second logic level, providing a first storage means containing a second binary video signal corresponding to a master image of the article in which the at least one selected object is not represented but instead in which the region of the article within the at least one selected object should lie is represented, providing a second storage means containing information defining the correct area of the at least one selected object on the article, reading the lines of the second binary video signal from the first storage means in synchronism with the lines of the first binary video signal, measuring in response to the first and second binary video signals the degree of overlap of the at least one selected object, as represented in the first binary video signal, with the respective region within which such object should lie, as represented in the second binary video signal, and comparing the measured degree of overlap of the at least one selected object as determined by the said measurement with the correct area of such object as defined by the information in the second storage means.

BRIEF DESCRIPTION OF THE DRAWINGS

Embodiments of the invention will now be described, by way of example, with reference to the accompanying drawings, wherein:

FIG. 5 is a block diagram of the measurement and comparison means 22 of FIG. 1, the image stores 19 and 20 of FIG. 1 being repeated.

DESCRIPTION OF THE PREFERRED EMBODIMENTS

Figure 1:
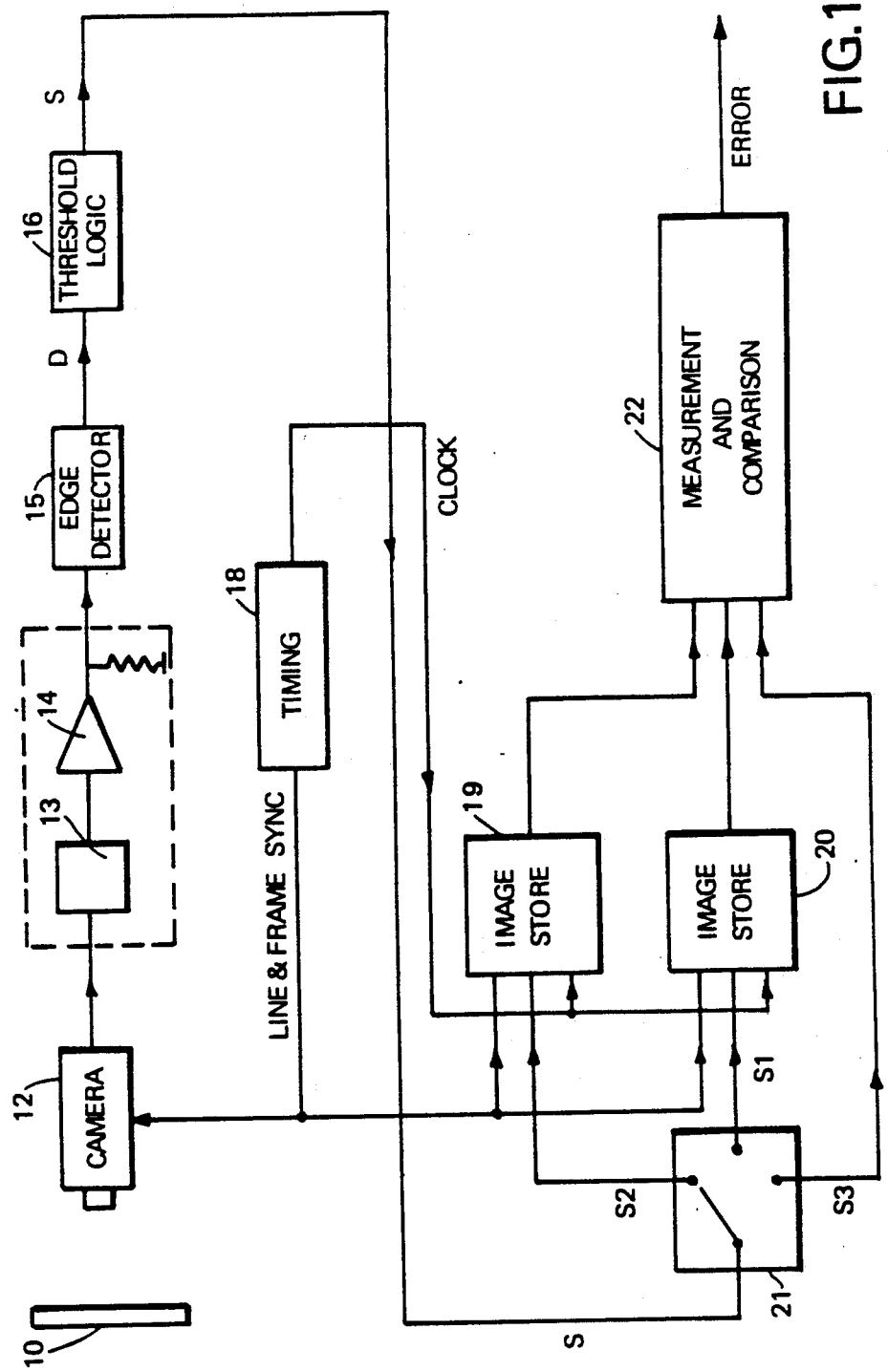
FIG. 1 is a block diagram of the "front end" of an inspection system according to the invention.

Referring first to FIG. 1, a system is shown for inspecting an article 10, the article 10 either being an article under test or a master article of the same type as the article under test, but which is known to be acceptable by prior manual inspection.

In the system, the article 10 is scanned in line-by-line raster fashion by a television-type camera 12, and the monochrome video signal thus produced is passed to a video amplifier circuit comprising a pre-amplifier 13 and a buffer amplifier 14.

Next, the amplified video signal is passed to an edge detector 15, which provides a signal D accurately defining the location of edges, i.e. boundaries between regions of contrasting intensity, in the image represented by the video signal.

Threshold logic 16 acts on the signal D and selects certain desired pairs of edges, corresponding to the opposite edges of particular features of interest in the image, to form a binary video signal S in which each selected feature is represented by a first logic level and non-selected features by a second logic level.

Thus far the system corresponds exactly to that described in the upper (test) channel of FIG. 1 of the aforementioned related application, and such application gives full details of the construction and operation of the items 12 to 16. However, the present invention is not limited to the particular means 12 to 16 shown in the aforementioned related application for producing the binary video signal S, and any means can be used which will produce, from an article 10 under inspection, a binary video signal S in which each selected feature is represented by a first logic level and non-selected features by a second logic level.

The system further comprises two image stores 19 and 20 respectively and measurement and comparison means 22, and the output of the threshold logic 16 (binary video signal S) may be selectively applied via an electronic switch 21 to the input of either one of the stores 19 and 21 or to the measurement and comparison means 22. The outputs of the stores 20 and 21 are also connected to the measurement and comparison means 22.

Briefly at this stage, the operation of the system is as follows in the case where it is desired to determine whether SMD electrodes are correctly located relative to their conductive pads.

First, a master board with SMD's mounted thereon is scanned by the camera 12, and the threshold logic 16 is set to detect just the features in the image thereof corresponding to the SDM electrodes. This provides a binary video signal S1 (master electrode image signal) corresponding to an image of just the SMD electrodes of the master board, and the switch 21 is set to store this signal S1 in the store 20.

Next, a bare master board (i.e. without mounted SMD's) is scanned by the camera 12, and the threshold logic 16 is set to detect just the features in the image thereof corresponding to the conductive pads within which the SDM electrodes should lie. This provides a further binary video signal S2 (pad image signal) corresponding to an image of just the pads of the master board, and the switch 21 is set to store this signal S2 in the store 19.

Finally, having stored the pad and electrode images of the master board (i.e. signals S1 and S2) in the stores 19 and 20 respectively, a board under test with SMD's mounted thereon is scanned by the camera 12, and the threshold logic 16 is set to detect just the features in the image thereof corresponding to the SDM electrodes of the test board. This provides yet a further binary video signal S3 (test electrode image signal) corresponding to an image of just the SMD electrodes of the test board.

During generation of the test electrode image signal S3, the lines of the pad image signal S2 and of the master electrode image signal S1 are read out from the stores 19 and 20 respectively in synchronism with the lines of the test electrode image signal S3, and these are all processed by the measurement and comparison means 22 to determine, in a manner to be described relative to FIG. 5, whether the electrodes of the test board are sufficiently accurately aligned with the pads.

Clearly, it is immaterial in which order the bare and assembled master boards are scanned and their images stored, prior to scanning the test board.

As in the case of the aforementioned related application, the camera 12 is in this embodiment a Hitachi KP120 camera, operated at a line frequency of 16 kHz and having a vertical resolution of 380 lines per frame. As will be described, the camera is maintained in strict synchronism with the read-out from the stores 20 and 21 by line and frame sync signals and clock signals provided by a timing circuit 18. The latter is based upon a 16.4 MHz crystal oscillator, and all system timing signals are derived from the oscillator output by dividers in conventional fashion.

The test and master boards are typically 12 inches by 10 inches, and are illuminated by means (not shown) which provide as even illumination as possible across the board, and the camera is orientated "square on" facing the board. Although the camera may view each board in its entirety, in general the field of view of the camera is adjusted according to the size of features to be detected and compared. For example, the camera will typically have a field of view of 1 inch by ¾ inch for a PCB with surface mounted devices.

Accordingly, references in this description and claims to an image of an article are to be construed as including a reference to an image of only part of the article.

It is clear that for the ultimate comparison to be meaningful, the field of view of the camera 12 in relation to the test and master boards must be identical in respect of any one comparison operation. This may be achieved in conventional manner by mounting the board currently to be scanned on an X-Y positioning table (not shown) which is movable in a plane normal to the optical axis of the camera 12, and ensuring that by adjusting the X-Y table the same field of view is seen for each board.

It is to be understood that the invention is not limited to the use of television type cameras for effecting the line-by-line scanning. For example, a CCD array or other opto-electrical scanner could be used. These are well known in the art.

Figure 2A:
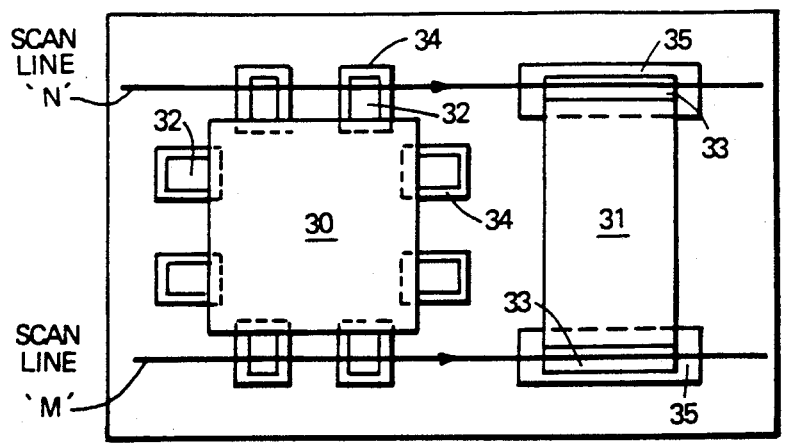
FIG. 2A is a plan view, as seen by the camera 12 of FIG. 1, of part of a PCB with SMD's located thereon.

FIG. 2A represents the field of view of the camera 12 for part of an assembled master board 10 currently in front of the camera 12. The components are deliberately simplified, but this does not affect the principles involved.

The field of view contains two SMD's 30 and 31, the device 30 having eight electrodes 32, two on each of four sides, and the device 31 having two electrodes 33, one at each end. Also shown are the conductive pads to which these electrodes are connected, these being the eight pads 34 for the electrodes 32 and the two pads 35 for the electrodes 33. It will be observed that in the master board the electrodes 32 and 33 lie accurately centered within their respective pads 34 and 35.

As mentioned previously, the master board is first raster scanned by the camera 12 and the threshold logic 16 set to detect only the electrodes 32 and 33.

The lines of the master electrode image signal S1 are read successively into the image store 20 under the control of frame and line sync signals and clock signals from the timing circuit 18 in conventional manner. Thus the frame sync signal identifies to the store 20 the start of scanning a new frame (field of view), the line sync signals identify the start of scanning each new line, and the clock signals, which occur at a pixel rate of 512 per line, sample the incoming signal S1 for a logic "1" or "0" and place the successively sampled values into consecutive store locations allocated to the current line as identified by the line sync signals.

Reading into the store 20 may occur over one or several frames, since after one full frame has been written in the information from following frames will be identical and will simply overwrite the existing information with the same information. A write enable input (not shown) to the store 20 determines the reading in time.

Figure 2B:
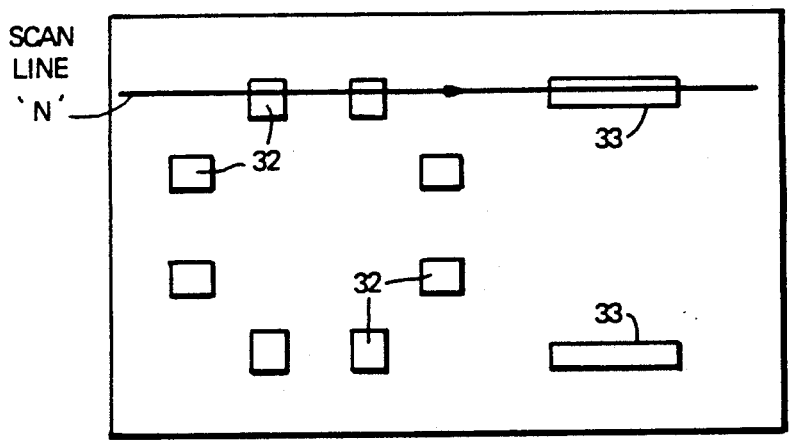
FIG. 2B illustrates the master image located in the image store 19 of FIG. 1 for the part of the PCB shown in FIG. 2A.

Upon completion of reading into the image store 20 the latter will then contain a binary video signal, the master electrode image signal S1 referred to above, stored in line by line form and corresponding to a master image of the board with only the electrodes 32 and 33 represented. The image represented by the signal now stored in the store 20 is shown in FIG. 2B. Assuming the master board is itself correct, the electrodes 32 and 33 will be represented in the image with their correct area and location.

Figure 4:
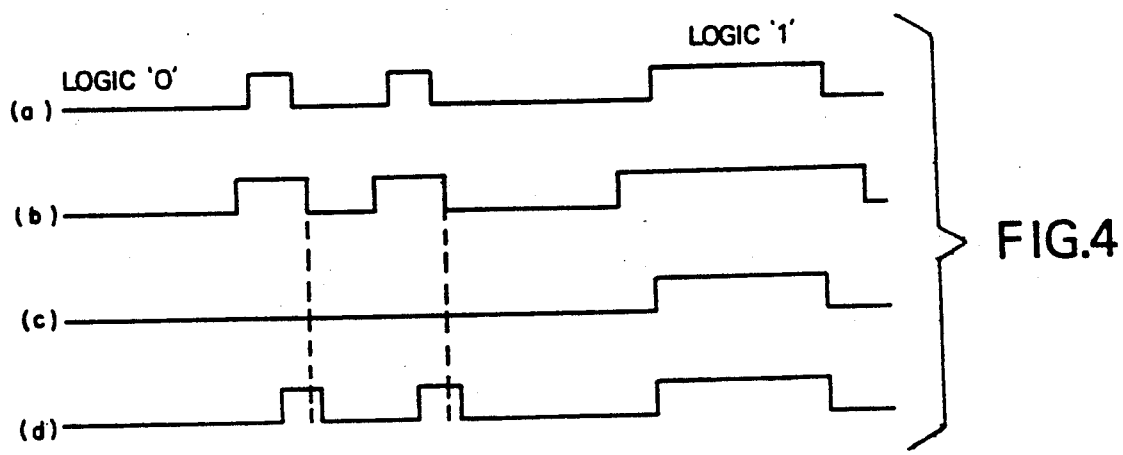
FIGS. 4a–4d are various lines of binary video signals useful in explaining the operation of the system.

For a typical scan line "N" passing through both the electrodes and pads shown at the top of FIG. 2A, the corresponding line of the master electrode image signal S1 is shown in line (a) of FIG. 4. It will be noted that the scan line "M" shown at the bottom of FIG. 2A will produce a similar line in the master electrode image signal S1.

Next, the assembled master board shown in FIG. 2A is replaced by a bare master board, i.e. without the SMD's 30 and 31, and this is raster scanned by the camera 12 and the threshold logic 16 set to detect only the pads 34 and 35.

The lines of the pad image signal S2 are read successively into the image store 19 under the control of frame and line sync signals and clock signals from the timing circuit 18 in the same manner as described above for the signal S1 and store 20.

Figure 2C:
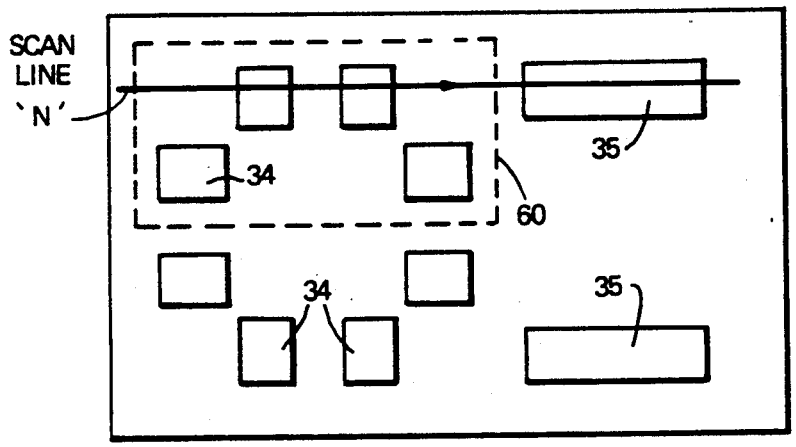
FIG. 2C illustrates the master image located in the image store 20 of FIG. 1 for the part of the PCB shown in FIG. 2A.

Upon completion of reading into the image store 19 the latter will then contain a binary video signal, the pad image signal S2, stored in line by line form and corresponding to a master image of the board with only the pads 34 and 35 represented. The image represented by the signal now stored in the store 19 is shown in FIG. 2C. Assuming the master board is itself correct, the pads 34 and 35 will be represented in the image with their correct area and location.

For the typical scan line "N" the corresponding line of the pad image signal S2 is shown in line (b) of FIG. 4. It will again be noted that the scan line "M" will produce a similar line in the pad image signal S2.

It will be understood that although the stores 19 and 20 have been shown as separate components, thay may in practice be part of the same single solid state store. Further, it will be assumed that in the foregoing, and in the remainder of this description, any delays in timing signals necessary to compensate for different delays in different parts of the system will have been compensated, as is conventional in the art.

After the master pad and electrode images have been stored in the stores 19 and 20 respectively, the master board is replaced in front of the camera 12 by an assembled board under test. If the field of view is correctly adjusted as mentioned above, and if the SMD electrodes are correctly located on their pads on the board, the image seen by the camera should be substantially identical to that shown in FIG. 2A.

Figure 3:
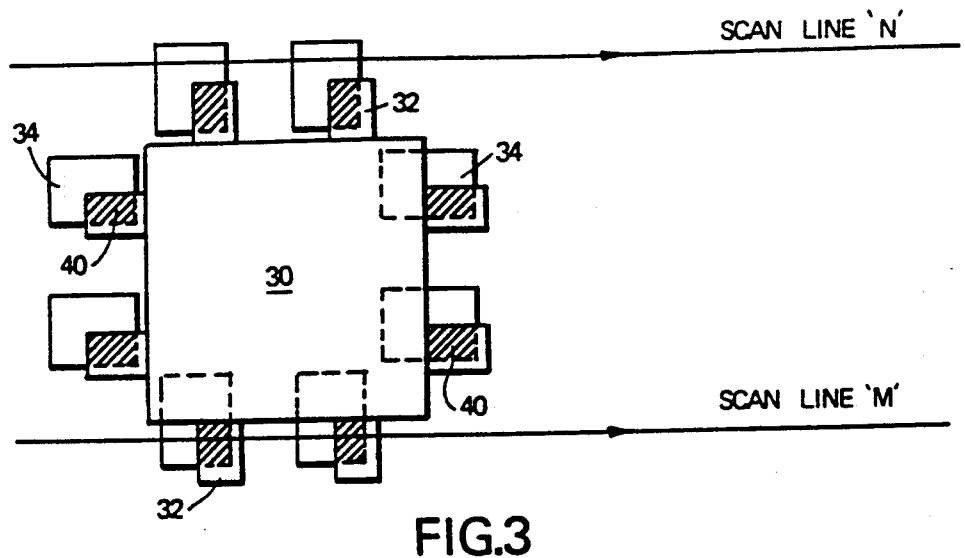
FIG. 3 illustrates an SMD not accurately located relative to its conductive pads.

However, the view will rarely be exactly the same, and FIG. 3 shows an exaggerated view of the component 30 on the test board displaced rightwardly and downwardly relative to the ideal correct position as defined by the master board. This is not necessarily unacceptable - the hatched areas 40 show the degree of overlap between the electrodes and the pads, and provided there is sufficient overlap the test board will be accepted, at least in respect of this component.

By way of example, line (c) of FIG. 4 shows the test electrode image signal S3 for the scan line "N" of the displaced component 30, and line (d) of FIG. 4 shows the signal S3 for the scan line "M". In lines (c) and (d) of FIG. 4, it is assumed that the component 31 of FIG. 2A remains correctly placed although it is not shown in FIG. 3.

Thus the general object of the measurement and comparison means 22 is to determine the degree of overlap, by comparing the signal S3 with the signal S2 read out from the store 19, and then compare the result with the correct area of the electrodes as determined from the signal read out from the store 20. It will be appreciated that for a correctly located electrode, the degree of overlap will be the same as the area of the electrode itself.

Referring now to FIG. 5, a pair of AND gates 50 and 51 are provided, and the binary video signal S3 (test electrode image signal) is supplied to one input of the AND gate 50. In frame and line synchronism with the application of the signal S3 to the AND gate 50, the previously stored signals S1 and S2 are read out from the stores 20 and 19 respectively, the signal S1 being applied to one input of the AND gate 51 and the signal S2 being applied in common to the other input of both AND gates 50 and 51.

It is to be understood that synchronized read-out from the stores 19 and 20 occurs under the control of frame and line sync signals and pixel rate clock signals in essentially the same way as read-in. A read enable signal is maintained on the line shown when read out is desired. Read-out will occur for at least one complete frame, and if desired for a several complete frames, and therefore the read enable signal will normally be derived from the frame sync signals.

It will be clear that the AND gate 50 will only give an output which is logic "1" during periods of overlap of the image of the test board electrodes as represented in the signal S3 with the image of the pads as represented in the signal S1. These are the hatched regions 40 in FIG. 3.

Similarly, the AND gate 51 will only give an output which is logic "1" during periods of overlap of the image of the master board electrodes as represented in the signal S2 with the image of the pads as represented in the signal S1. Of course, since in the master board the electrodes lie wholly within the pads, the output of the AND gate 51 will just be in respect of the electrodes. In principle, therefore, it is not necessary to gate the signal S1 with the signal S2, but doing so has the advantage of eliminating any spurious signals which might arise from scanning portions of the master board outside the pad regions.

The outputs of the AND gates 50 and 51 are applied each to one input of a respective further AND gate 52 or 53, and pixel rate clock signals are applied in common to the other inputs of the two AND gates 52 and 53.

Thus the outputs of the AND gates 50 and 51 gate the clock pulse and, assuming for the moment that the AND gates 54 and 55 are continuously "open", the gated clock pulses from the AND gates 52 and 53 are passed to counters 57 and 58 respectively.

It will be evident from the foregoing that at the end of the read period of the stores 19 and 20, i.e. after the read enable signal has been removed after one or more frames, the content X1 of the counter 58 will be directly proportional to the total area of the overlapping regions 40 in FIG. 3, and the content X2 of the counter 57 will be directly proportional to the total area of the electrodes in FIG. 2B.

If $X1 = X2$, one can assume that on the test board the electrodes 32 and 33 lie wholly within their respective pads 34 and 35, and that the test board is therefore acceptable, at least in respect of the field of view inspected.

If, however, X1 differs from X2 by more than a tolerance dX, one can assume that either one or more devices are displaced by more than an acceptable amount, or that one or more electrodes are bent off their pads, or even that a component is the wrong component or is missing.

The acceptability or not is determined by a comparator 59. When counting is complete, a read signal applied to the counters 57 and 58 causes the latter to input their respective counts to the comparator 59. In known manner, the comparator compares the difference between X1 and X2 with the tolerance dX, and generates an error signal if the difference exceeds this tolerance.

It will be recognized that the foregoing arrangement will only give an error signal in respect of the entire field of view; in other words it will not identify the cause of the error.

Therefore, it is advantageous to permit a comparison to be made as aforesaid in respect of a subdivision of the field of view or "window", and to make a comparison only in respect of such window. For example, it may be desired to examine only within the window 60 in FIG. 2C.

Accordingly, a window generator 56 is provided, whose output is applied to one input of each of the two AND gates 54 and 55 to gate the clock signals from the AND gates 52 and 53. The window generator 56 contains counters responsive to frame and line sync pulses and to pixel rate clock pulses to define the boundary of the window 60, and provides an enabling output to the AND gates 55 and 56 only in respect of those portions of the scan lines which occur within the window.

The general principles of window generators are known in image processing, and they may be programmed to provide any desired window within the field of view.

Thus in the case of the window 60, the count values X1 and X2 will only relate to measurements made within the window 60, so that any error signal can be directly related to the corresponding area of the board under test.

Any number of windows can be defined, and if desired the entire field of view can be electronically subdivided both vertically and horizontally into rectangles constituting vertically and horizontally contiguous windows each containing for example a single pad or subset of pads, with independent measurement and comparison operations being performed in respect of each window or electronic subdivision.

Each window can be dealt with in turn in a respective frame scan, in which case the circuit of FIG. 5 can be used. However, if all the windows are to be dealt with during the same frame scan, the counters 57 and 58 will have to be reset at the vertical window boundaries, and the partial count for each line segment of each window stored and accumulated until the end of the window, at which point a comparison can take place. The means by which multiple windows can be handled are well within the abilities of one skilled in the art.

It will be appreciated that additional image stores may be provided for, for example, gating the signals S1 and S3, in addition to the gating provided by the signal S2 from the store 19. This may be appropriate where only a sub-set of the desired pads can be discriminated by the threshold logic 16 at any one time, due to different contrast against the background, so that several stores such as 19 would be required to hold the complete pad information.

Alternatively, however, the single store 19 could be used with several scans of the bare master board taking place with different threshold levels set to select all the desired pads, and with the results of each scan being non-destructively read into and therefore accumulated in the store 19 to give a final overall pad image.

Finally, the store 20 need not necessarily be an image store. It could for example just hold the correct pre-measured area, in the form of the pixel count X1, of the SMD electrodes, either for the entire field of view or for a window, with the count X1 therein being released for comparison with X2 at the appropriate time. In other words, the store 20 would replace the counter 58, and the AND gates 51, 53 and 55 would not be necessary.

I claim:

1. An image processing system for inspecting an article under test to determine whether at least one selected object is correctly located on the article, the system comprising:
   raster scan means for line-by-line scanning the article to generate a video signal corresponding to an image of the article,
   threshold logic for converting the video signal into a first binary video signal in which the at least one selected object on the article is represented by a first logic level and non-selected objects and background are represented by a second logic level,
   a first storage means for storing a second binary video signal corresponding to a master image of the article in which the at least one selected object is not represented but instead in which the region of the article within which the at least one selected object should lie is represented,
   a second storage means for storing information defining the correct area of the at least one selected object on the article,
   means for reading the lines of the second binary video signal from the first storage means such that the lines of the second binary video signal are in synchronism with the lines of the first binary video signal,
   measuring means responsive to the first and second binary video signals for measuring the degree of overlap of the at least one selected object, as represented in the first binary video signal, with the respective region within which such object should lie, as represented in the second binary video signal, and
   comparison means for comparing the measured degree of overlap of the at lest one selected object as determined by the measuring means with the correct area of such object as defined by the information in the second storage means.

2. An image processing system according to claim 1, wherein the measuring means comprises gating logic for gating the first binary video signal with the second binary video signal, and means for counting clock signals during periods of the gated first binary video signal which represents the at least one selected object in the image of the article under test.

3. An image processing system according to claim 2, wherein the second storage means is adapted for storing a third binary video signal corresponding to a master image of the article in which the at least one selected object on the article is represented with correct area and location, and wherein second measuring means are provided responsive to the third binary video signal for measuring the correct area of the at least one selected object as represented in the third binary video signal.

4. An image processing system according to claim 3, wherein the second measuring means comprises means for counting clock signals during periods of the third binary video signal which represent the at least one selected object in the master image.

5. An image processing system according to claim 4, wherein the second measuring means comprises further gating logic for gating the third binary video signal with the second binary video signal prior to counting the clock signals.

6. An image processing system according to claim 4, wherein the comparison means comprises means for comparing the clock signals counted by the first and second measuring means at a selected moment, and generating an error signal if the difference between the counted clock signals exceeds a selected tolerance.

7. An image processing system according to claim 1, wherein the first and/or second storage means are each selectively connectable to the threshold logic whereby the second and/or third binary video signals can be derived by scanning and thresholding a master article and storing the resulting signal in its respective store prior to scanning the article under test.

8. An image processing method for inspecting an article under test to determine whether at least one selected object is correctly located on the article, the method comprising:
   line-by-line raster scanning the article to generate a video signal corresponding to an image of the article,
   converting the video signal by threshold logic into a first binary video signal in which the at least one selected object on the article is represented by a first logic level and non-selected objects and background are represented by a second logic level,
   providing a first storage means containing a second binary video signal corresponding to a master image of the article in which the at least one selected object is not represented but instead in which the region of the article within the at least one selected object should lie is represented,
   providing a second storage means containing information defining the correct area of the at least one selected object on the article,
   reading the lines of the second binary video signal from the first storage means such that the lines of the second binary video signal are in synchronism with the lines of the first binary video signal,
   measuring in response to the first and second binary video signals the degree of overlap of the at least one selected object, as represented in the first binary video signal, with the respective region within which such object should lie, as represented in the second binary video signal, and
   comparing the measured degree of overlap of the at least one selected object as determined by the said measurement with the correct area of such object as defined by the information in the second storage means.

* * * * *